(12) United States Patent
Asif Bashir et al.

(10) Patent No.: US 12,148,452 B1
(45) Date of Patent: Nov. 19, 2024

(54) CURRENT DISTAL TO MEDIA FACING SURFACE

(71) Applicant: Western Digital Technologies, Inc., San Jose, CA (US)

(72) Inventors: Muhammad Asif Bashir, San Jose, CA (US); Suping Song, Fremont, CA (US); Yaguang Wei, Pleasanton, CA (US); Terence T. Lam, Cupertino, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,081

(22) Filed: Aug. 1, 2023

Related U.S. Application Data (60) Provisional application No. 63/465,318, filed on May 10, 2023.

(51) Int. Cl.
  *G11B 5/11* (2006.01)
  *G11B 5/115* (2006.01)

(52) U.S. Cl.
  CPC .................................. *G11B 5/115* (2013.01)

(58) Field of Classification Search
  None
  See application file for complete search history.

(56) References Cited

U.S. PATENT DOCUMENTS

| | | | |
|---|---|---|---|
| 4,136,370 A | * | 1/1979 | Moeller ................. G11B 5/335 360/111 |
| 8,542,461 B2 | | 9/2013 | Bai et al. |
| 8,842,383 B1 | * | 9/2014 | Balamane .............. G11B 5/314 360/31 |
| 9,142,227 B1 | * | 9/2015 | Etoh .................... G11B 5/1278 |
| 9,361,912 B1 | | 6/2016 | Liu et al. |
| 10,325,618 B1 | | 6/2019 | Wu et al. |
| 10,636,439 B2 | | 4/2020 | Le et al. |

(Continued)

OTHER PUBLICATIONS

"Toshiba Demonstrates Substantial Improvements in HDD Recording Performance with MAS-MAMR", Toshiba, Jan. 2022, <https://www.techpowerup.com/290735/toshiba-demonstrates-substantial-improvements-in-hdd-recording-performance-with-mas-mamr>, pp. 1-2.

(Continued)

*Primary Examiner* — William J Klimowicz
(74) *Attorney, Agent, or Firm* — PATTERSON + SHERIDAN, LLP

(57) ABSTRACT

The present disclosure generally relates to a magnetic recording system comprising a magnetic recording head. The magnetic recording head comprises a main pole disposed at a media facing surface (MFS). The main pole is disposed between a trailing shield and a leading shield, the trailing shield and the leading shield each extending to the MFS. A first lead is disposed between the main pole and the trailing shield, and the first lead is recessed from the MFS. A first portion of the first lead is disposed in contact with the main pole. A first insulating layer is disposed between and in contact with a second portion of the first lead and the main pole, and the first insulating layer being recessed from the MFS. The first lead and the first insulating layer direct a current through the main pole at a location recessed from the MFS.

20 Claims, 7 Drawing Sheets

(56) References Cited

U.S. PATENT DOCUMENTS

| | | | |
|---|---|---|---|
| 10,714,127 B1 | 7/2020 | Chen et al. | |
| 10,714,129 B1 | 7/2020 | Tang et al. | |
| 10,777,219 B1* | 9/2020 | Asif Bashir | G11B 5/1278 |
| 10,789,975 B1* | 9/2020 | Song | G11B 5/115 |
| 10,811,034 B1 | 10/2020 | Wu et al. | |
| 10,891,974 B1* | 1/2021 | Chembrolu | G11B 5/23 |
| 11,348,605 B1 | 5/2022 | Liu et al. | |
| 11,557,314 B1* | 1/2023 | Asif Bashir | G11B 5/235 |
| 11,900,971 B1* | 2/2024 | Goncharov | G11B 5/3116 |
| 2020/0152228 A1* | 5/2020 | Tang | G11B 5/232 |
| 2022/0059131 A1 | 2/2022 | Wu | |
| 2023/0044051 A1* | 2/2023 | Lam | G11B 5/187 |

OTHER PUBLICATIONS

Mellor, Chris et al., "Toshiba's disk drive: WTF is the flux control effect?", Blocks & Files, Mar. 2021, <https://blocksandfiles.com/2021/03/15/toshibas-disk-drive-fc-mamr-explainer/>, pp. 1-3.

* cited by examiner

CURRENT DISTAL TO MEDIA FACING SURFACE

CROSS-REFERENCE TO RELATED APPLICATIONS

This application claims benefit of U.S. provisional patent application Ser. No. 63/465,318, filed May 10, 2023, which is herein incorporated by reference.

BACKGROUND OF THE DISCLOSURE

Field of the Disclosure

Embodiments of the present disclosure generally relate to a magnetic recording system comprising a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, microwave-assisted magnetic recording (MAMR) is one type of energy-assisted recording technology to improve the recording density of a magnetic recording medium, such as a HDD. In MAMR, a spin torque oscillator (STO) device or a spintronic device is located next to or near the write element such that in operation, when current is applied, the STO enhances the write field of the write pole. In addition, the STO produces a high-frequency AC field, such as in a microwave frequency band, that reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Such recording write heads may require an undesirable high voltage and/or an undesirable high current to produce a write field enhancement. A high voltage and/or high current may impact the lifetime and the reliability of the write head by degrading components of the write head, such as a tip of the write pole. Lowering the voltage, moment-thickness product of the energy-assist magnetic layer, or the current can hinder writer performance, lower areal density capability (ADC), and/or limit the materials used in write heads.

Therefore, there is a need in the art for an improved magnetic recording device capable of handling the high current requirements without degrading.

SUMMARY OF THE DISCLOSURE

The present disclosure generally relates to a magnetic recording system comprising a magnetic recording head. The magnetic recording head comprises a main pole disposed at a media facing surface (MFS). The main pole is disposed between a trailing shield and a leading shield, the trailing shield and the leading shield each extending to the MFS. A first lead is disposed between the main pole and the trailing shield, and the first lead is recessed from the MFS. A first portion of the first lead is disposed in contact with the main pole. A first insulating layer is disposed between and in contact with a second portion of the first lead and the main pole, and the first insulating layer being recessed from the MFS. The first lead and the first insulating layer direct a current through the main pole at a location recessed from the MFS.

In one embodiment, a magnetic recording head comprises a trailing shield disposed at a media facing surface (MFS), a main pole disposed adjacent to the trailing shield at the MFS, a first lead disposed between the main pole and the trailing shield, the first lead being recessed from the MFS, wherein a first portion of the first lead is disposed in contact with the main pole, and a first insulating layer disposed between and in contact with a second portion of the first lead and the main pole, the first insulating layer being recessed from the MFS.

In another embodiment, a magnetic recording head comprises a trailing shield disposed at a media facing surface (MFS), a main pole disposed adjacent to the trailing shield at the MFS, a leading shield disposed adjacent to the main pole at the MFS, a trailing side lead disposed between the main pole and the trailing shield, the trailing side lead being recessed from the MFS, wherein a first portion of the trailing side lead is disposed in contact with the main pole, a trailing side insulating layer disposed between and in contact with a second portion of the trailing side lead and the main pole, the trailing side insulating layer being recessed from the MFS, a leading side lead disposed between the main pole and the leading shield, the leading side lead being recessed from the MFS, wherein a first portion of the leading side lead is disposed in contact with the main pole, and a leading side insulating layer disposed between and in contact with a second portion of the leading side lead and the main pole, the leading side insulating layer being recessed from the MFS.

In yet another embodiment, a magnetic recording device comprises a magnetic recording head, the magnetic recording head comprising: a trailing shield disposed at a media facing surface (MFS), a main pole disposed adjacent to the trailing shield at the MFS, a spintronic device disposed between the trailing shield and the main pole at the MFS, a first lead disposed between the main pole and the trailing shield, the first lead being recessed from the MFS, wherein a first portion of the first lead is disposed in contact with the main pole, and means for directing a current from the first lead into the main pole at a first location recessed from the spintronic device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording system comprising a magnetic recording head. The magnetic recording head comprises a main pole disposed at a media facing surface (MFS). The main pole is disposed between a trailing shield and a leading shield, the trailing shield and the leading shield each extending to the MFS. A first lead is disposed between the main pole and the trailing shield, and the first lead is recessed from the MFS. A first portion of the first lead is disposed in contact with the main pole. A first insulating layer is disposed between and in contact with a second portion of the first lead and the main pole, and the first insulating layer being recessed from the MFS. The first lead and the first insulating layer direct a current through the main pole at a location recessed from the MFS.

Figure 1:
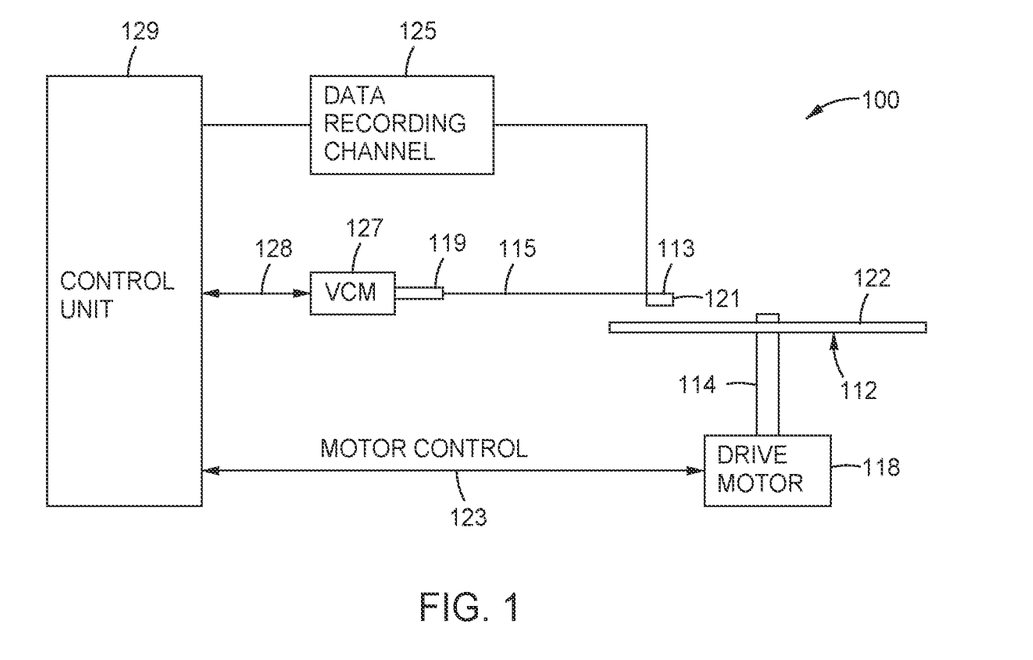
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnetic recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
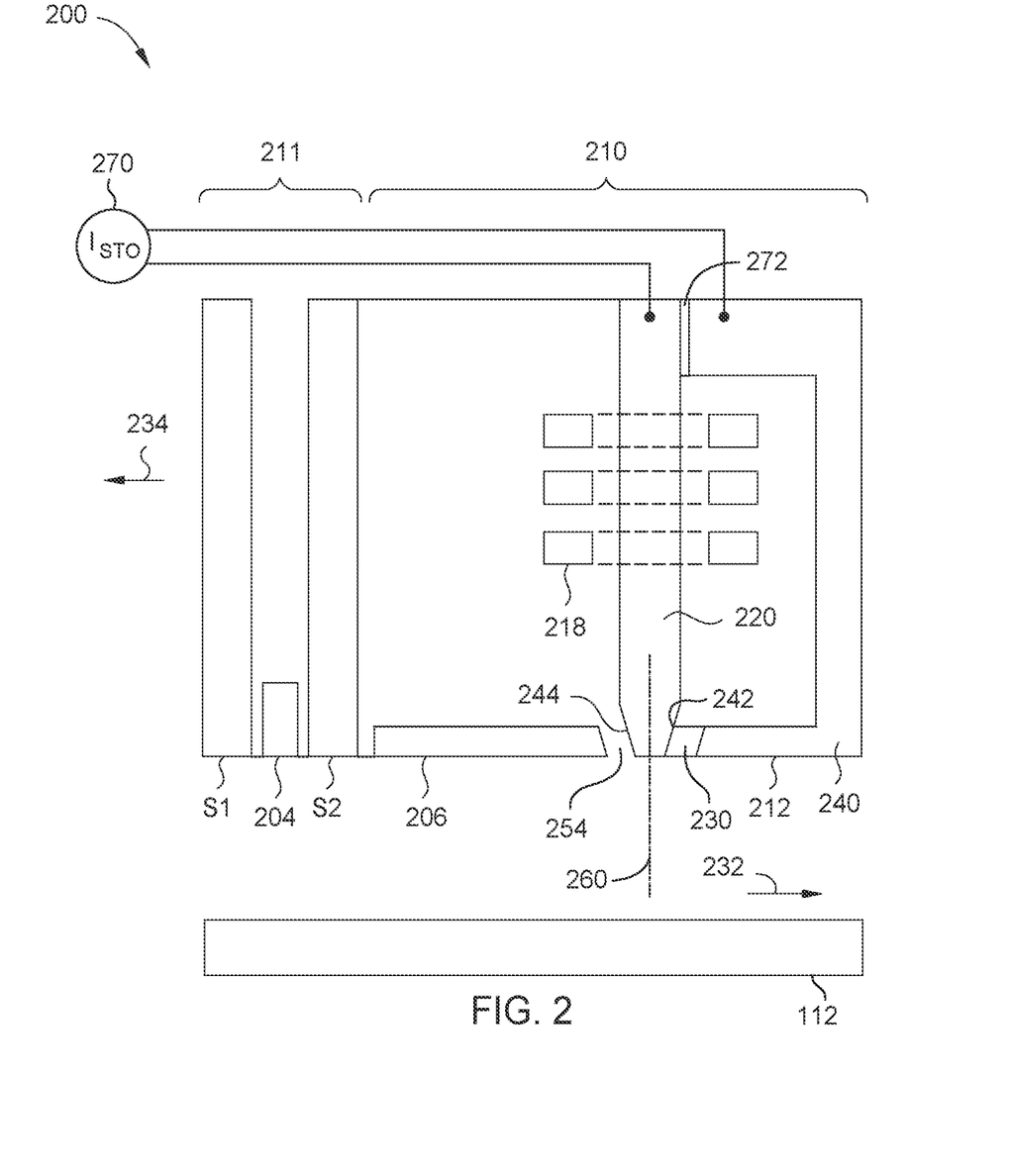
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

Figure 3:
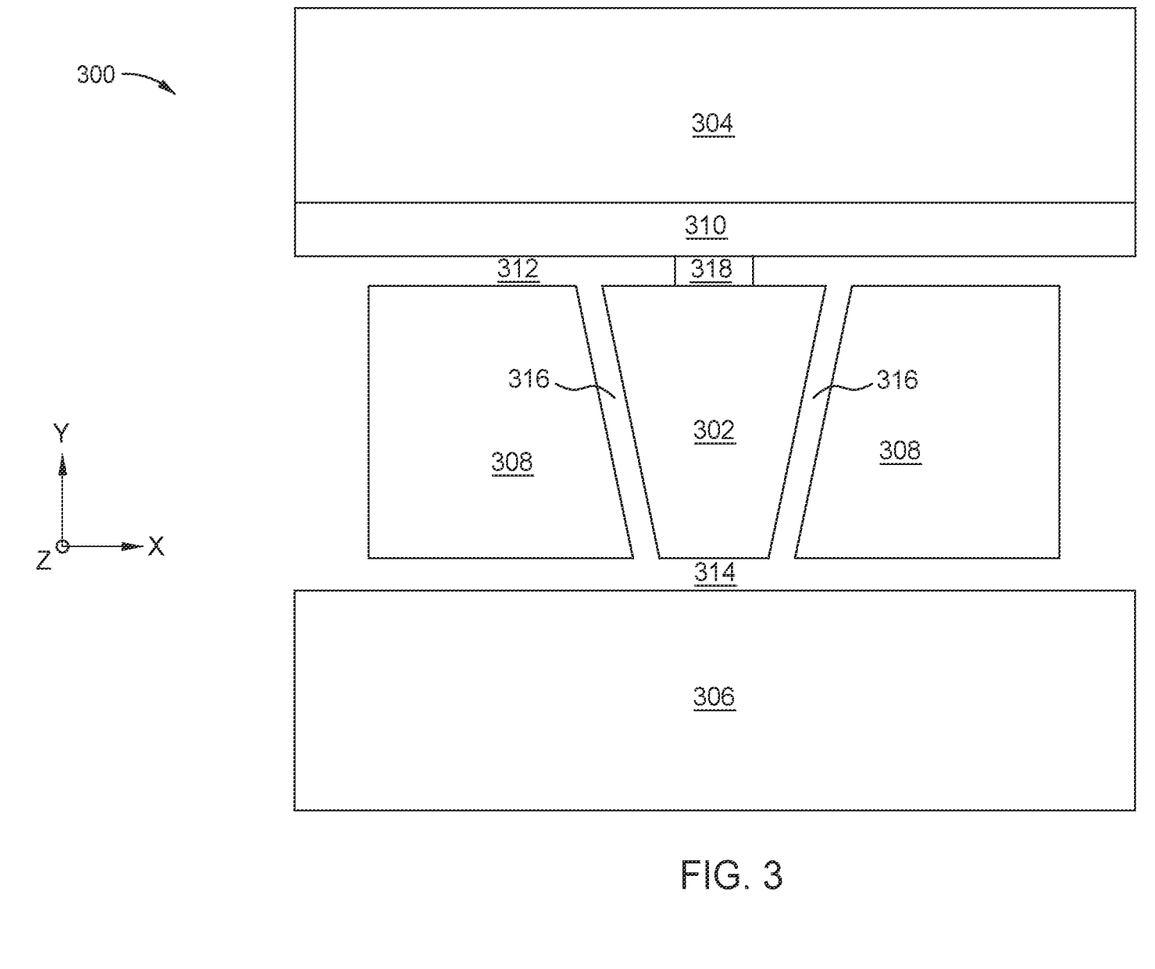
FIG. 3 illustrates a MFS view of a magnetic recording head, according to one embodiment.

FIG. 3 illustrates a MFS view of a magnetic recording head 300, according to one embodiment. The magnetic recording head 300 may be within, or a part of, the magnetic recording device 100 of FIG. 1. The magnetic recording head 300 may be the write head 210 of FIG. 2.

The magnetic recording head 300 comprises a main pole 302, a trailing shield 304 disposed above the main pole 302, a leading shield 306 disposed below the main pole 302, and side shields 308 disposed adjacent to the main pole 302 between the trailing shield 304 and the leading shield 306. The main pole 302 is spaced from the trailing shield 304 by a trailing gap 312. An optional spintronic device 318 may be disposed in the trailing gap 312 between the main pole 302 and the trailing shield 304. In some embodiments, the trailing shield 304 comprises a hot seed layer 310 disposed adjacent to the trailing gap 312.

The side shields 308 are spaced from the main pole 302 by side gaps 316, and the leading shield 306 is spaced from the main pole 302 by a leading gap 314. In some embodiments, the trailing gap 312, the side gaps 316, and the leading gap 314 are a continuous layer. The trailing gap 312, the side gaps 316, and the leading gap 314 may each individually comprise an insulating material, such as AlOx or SiN.

FIGS. 4A-4E illustrates cross-sectional views of magnetic recording heads 400, 450, 475, 485, 495, respectively, according to various embodiments. Each magnetic recording head 400, 450, 475, 485, 495 may be the magnetic recording head 300 of FIG. 3, or the write head 210 of FIG. 2. Each magnetic recording head 400, 450, 475, 485, 495 may be within, or a part of, the magnetic recording device 100 of FIG. 1. Aspects of the magnetic recording heads 400, 450, 475, 485, 495 may be used in combination with one another.

Figure 4A:
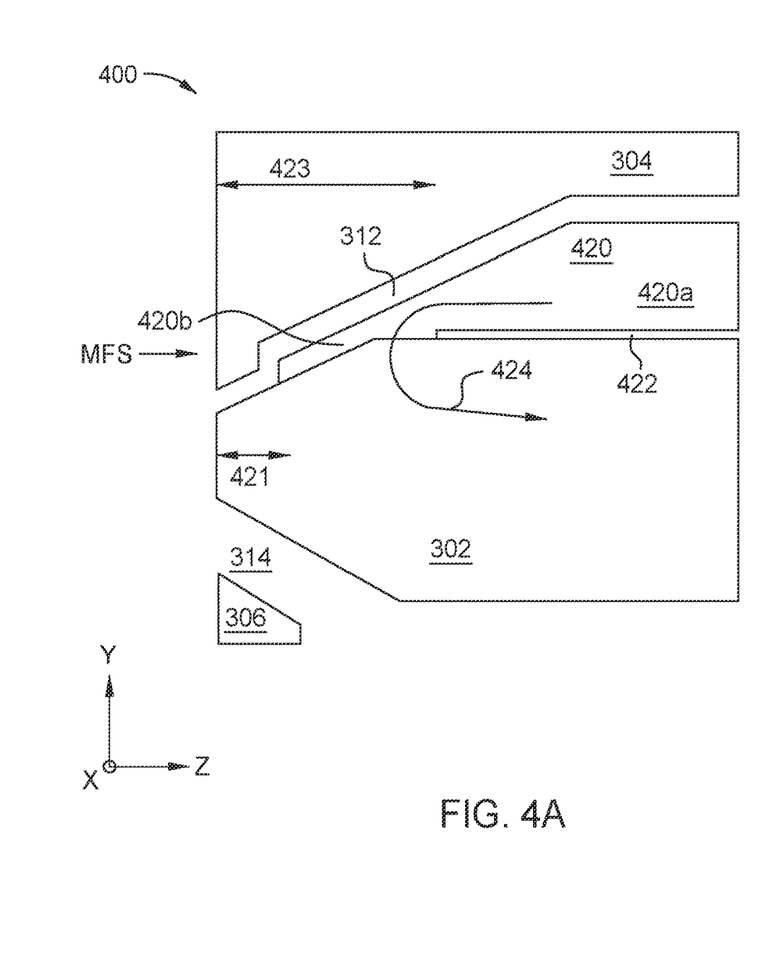
FIGS. 4A-4E illustrates cross-sectional views of magnetic recording heads, according to various embodiments.

The magnetic recording head 400 of FIG. 4A is an embodiment that does not include the optional spintronic device. However, in some embodiments, the magnetic recording head 400 may comprise the spintronic device 318. As shown in FIG. 4A, the main pole 302, the trailing shield 304, the trailing gap 312, and the leading gap 314 each extend from the MFS into the magnetic recording head 400. A first lead 420 is disposed between the main pole 302 and the trailing gap 312. The first lead 420 may be referred to as a trailing side lead 420. The first lead 420 is at least partially disposed in contact with the main pole 302. The first lead 420 contacts the main pole 302 for a length 425 (shown in FIG. 4D) of about 150 nm to about 550 nm. The first lead 420 is recessed from the MFS a distance 421 of about 80 nm to about 150 nm in the z-direction. Thus, the first lead 420 is not seen from a MFS view of the magnetic recording head 400, like shown in FIG. 3. The first lead 420 may comprise one or more layers of materials selected from the group consisting of Cu, Cr, and Au, as discussed below in FIGS. 4D-4E.

A first insulating layer 422 is disposed between a portion of the main pole 302 and the first lead 420. The first insulating layer 422 may comprise AlOx, where x is a numeral, and have a thickness in the y-direction of about 3 nm to about 10 nm. The first insulating layer 422 may be recessed a distance 423 of about 150 nm to about 550 nm from the MFS. As such, the first lead 420 is disposed in contact with the main pole 302 a distance of about 50 nm to about 550 nm. A first portion 420a of the first lead 420 may have a first width adjacent to the first insulating layer 422 that is conformal to the main pole 302, where the width is variable as flare angle change in the cross-track direction. For example, the first portion 420a may have a width of about 100 nm to about 135 nm. A second portion 420b of the first lead 420 may have a second width less than the first portion 420a where the first lead 420 contacts the main pole 302, where the width of the second portion 420b is conformal to the main pole 302, and where the width is variable as flare angle change in the cross-track direction. For example, the second portion 420b may have a width of about 95 nm to about 130 nm.

When current is applied to the magnetic recording head 400, the first lead 420 directs the current to the main pole 302 where the main pole 302 and the first lead 420 are in contact, as shown by the current arrow 424. The first insulating layer 422 prevents the current from being directed into the main pole 302 too far away from the MFS. Because the first lead 420 is recessed the distance 421 from the MFS, the current does not flow too closely to the MFS.

Figure 4B:
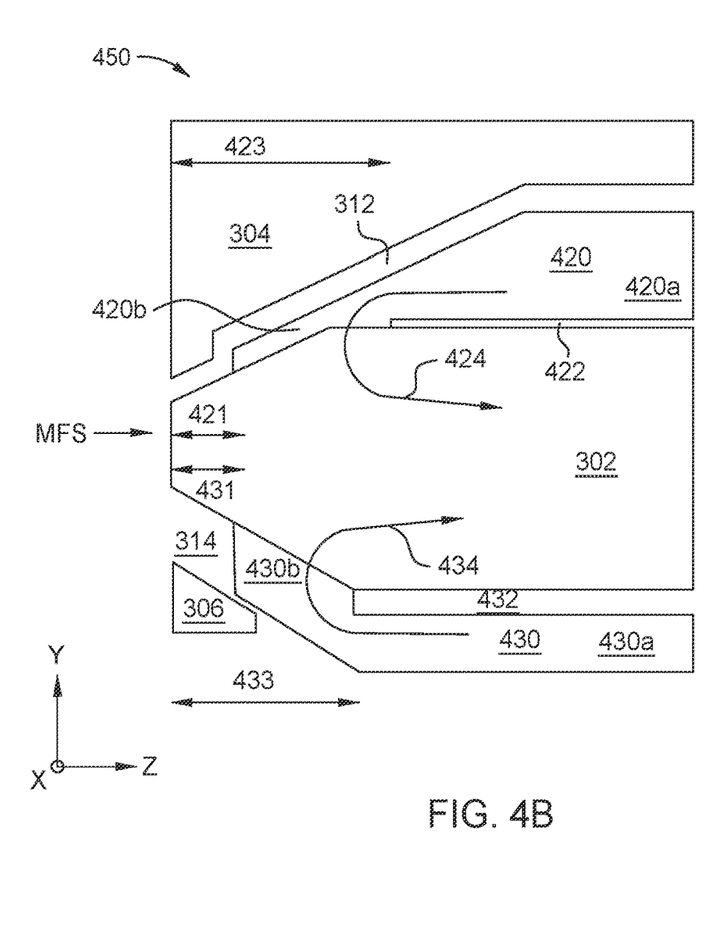

The magnetic recording head 450 of FIG. 4B is similar to the magnetic recording head 400 of FIG. 4A; however, the magnetic recording head 450 further comprises a second lead 430 and a second insulating layer 432. The second lead 430 is disposed between the main pole 302 and the leading gap 314. The second lead 430 may be referred to as a leading side lead 430. The second lead 430 is at least partially disposed in contact with the main pole 302. The second lead 430 contacts the main pole 302 for a length of about 150 nm to about 550 nm. The second lead 430 is recessed from the MFS a distance 431 of about 80 nm to about 150 nm in the z-direction. Thus, the second lead 430 is not seen from a MFS view of the magnetic recording head 450, like shown in FIG. 3. The second lead 430 may comprise one or more layers of materials selected from the group consisting of Cu, Cr, and Au, as discussed below in FIGS. 4D-4E. In some embodiments, the distance 421 and the distance 431 are substantially equal. The first lead 420 and the second lead 430 may comprise the same materials, or the first and second leads 420, 430 may comprise different materials.

A second insulating layer 432 is disposed between a portion of the main pole 302 and the second lead 430. The second insulating layer 432 may comprise AlOx, where x is a numeral, and have a thickness in the y-direction of about 3 nm to about 10 nm. The second insulating layer 432 may be recessed a distance 433 of about 150 nm to about 550 nm from the MFS. As such, the second lead 430 is disposed in contact with the main pole 302 a distance of about 50 nm to about 550 nm. A first portion 430a of the second lead 430 may have a first width adjacent to the first insulating layer 422 that is conformal to the main pole 302, where the width is variable as flare angle change in the cross-track direction. For example, the first portion 430a may have a width of about 95 nm to about 130 nm. A second portion 430b of the second lead 430 may have a second width greater than or equal to the width of the first portion 430a where the second lead 430 contacts the main pole 302, where the width of the second portion 430b is conformal to the main pole 302, and where the width is variable as flare angle change in the cross-track direction. For example, the second portion 430b may have a width of about 100 nm to about 135 nm.

When current is applied to the magnetic recording head 450, the first lead 420 directs the current to the main pole 302 on the trailing shield 304 side, where the main pole 302 and the first lead 420 are in contact, as shown by the current arrow 424. The first insulating layer 422 prevents the current from being directed into the main pole 302 too far away from the MFS. Similarly, the second lead 430 directs the current to the main pole 302 on the leading shield 306 side, where the main pole 302 and the second lead 430 are in contact, as shown by the current arrow 434. The second insulating layer 432 prevents the current from being directed into the main pole 302 too far away from the MFS. Because the first lead 420 and the second lead 430 are each recessed from the MFS, the current does not flow too closely to the MFS.

Figure 4C:
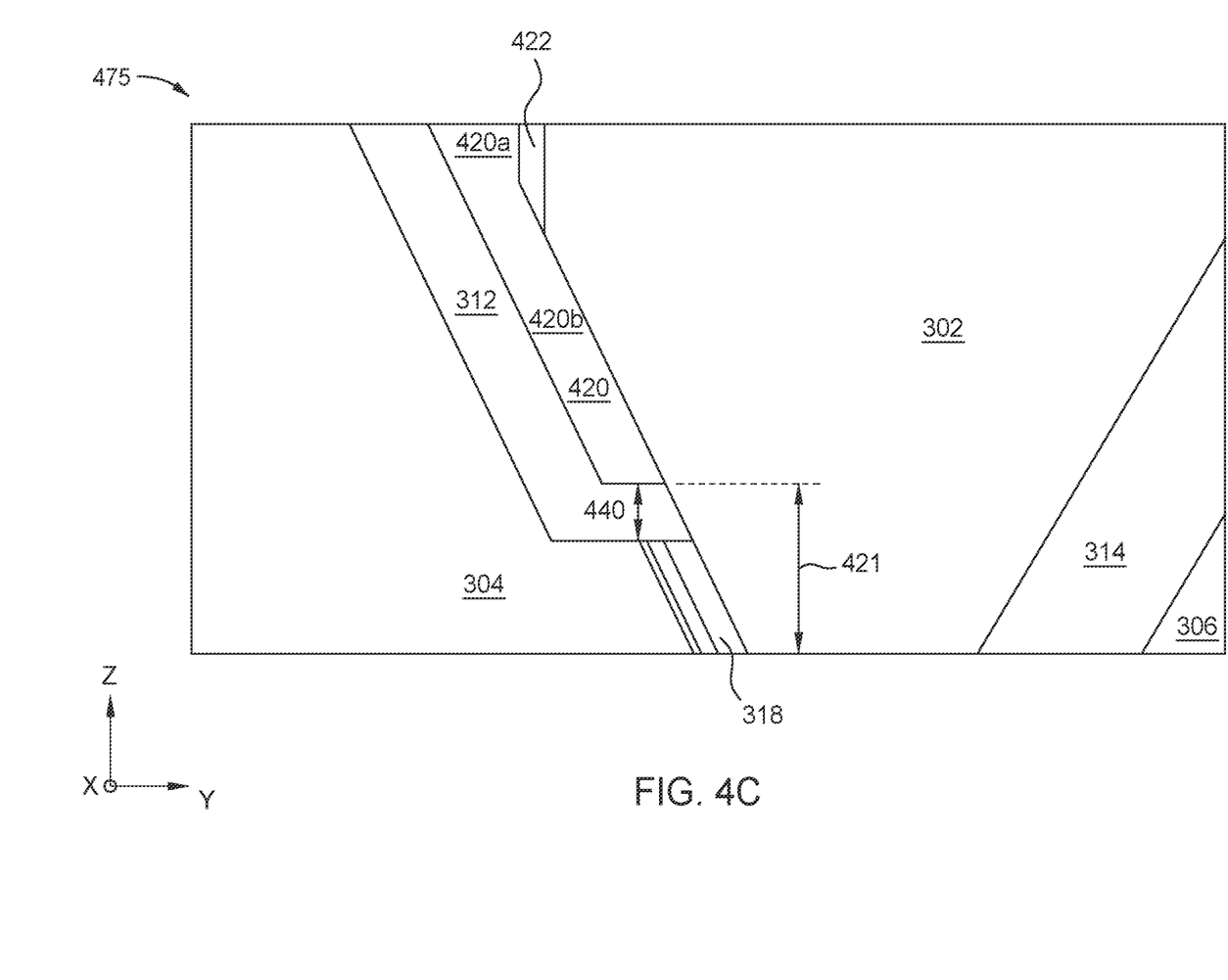

The magnetic recording head 475 of FIG. 4C is similar to the magnetic recording head 400 of FIG. 4A; however, the magnetic recording head 475 comprises a spintronic device 318 at the MFS between the main pole 302 and the trailing shield 304. The spintronic device 318 is spaced a distance 440 of about 30 nm to about 100 nm from the first lead 420. In some embodiments, the spintronic device comprises an electrically conductive material. In other embodiments, the spintronic device 318 comprises a spin torque layer (STL). The spintronic device 318 may be the spintronic device 230 of FIG. 2.

When current is applied to the magnetic recording head 475, the first lead 420 directs the current to the main pole 302 where the main pole 302 and the first lead 420 are in contact, preventing the majority of current from flowing through the spintronic device 318. The first insulating layer 422 prevents the current from being directed into the main pole 302 too far away from the MFS. Because the first lead 420 is recessed the distance 421 from the MFS, the current does not flow too closely to the MFS, thus protecting the spintronic device 318.

Figure 4D:
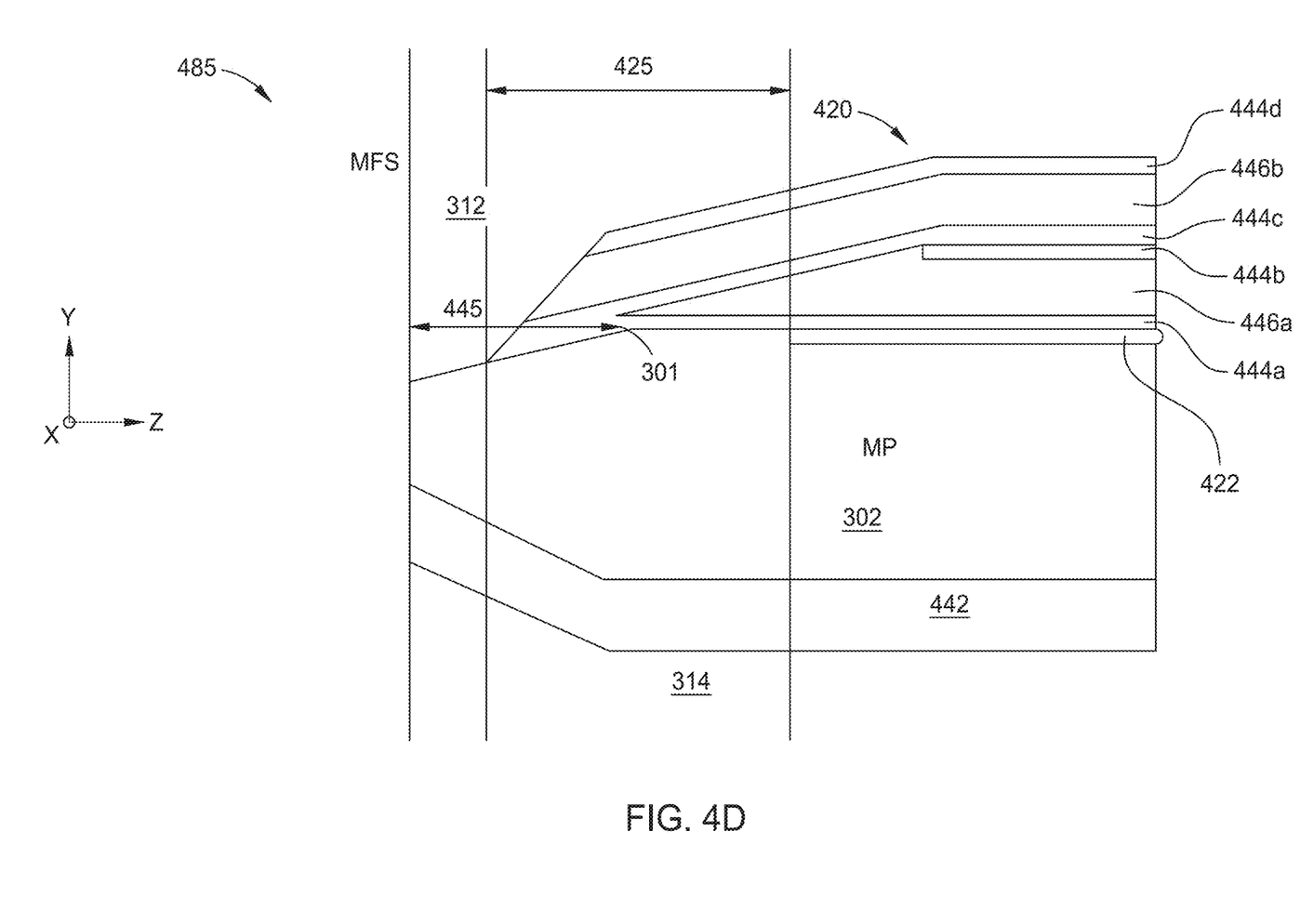

The magnetic recording head 485 of FIG. 4D is similar to the magnetic recording head 400 of FIG. 4A; however, the magnetic recording head 485 comprises a Ru layer 442 disposed on the leading shield of the main pole 302. The Ru layer 442 extends to the MFS and has a thickness in the y-direction of about 30 nm to about 80 nm.

A stripe height 445 from the MFS to the trailing taper 301 of the main pole 302 is about 150 nm to about 350 nm. FIG. 4D further illustrates one embodiment of the first lead 420 comprising multiple layers of various materials. While only the first lead 420 is shown, the second lead 430 may comprise the same layers and/or materials as the first lead 420.

As shown in FIG. 4D, the first lead 420 comprises a first layer 444a of a first material disposed in contact with the first insulating layer 422 and the main pole 302, a first layer 446a of a second material disposed on the first layer 444a of the first material, a second layer 444b of the first material disposed on the first layer 446a of the second material, a third layer 444c of the first material disposed on the second layer 444b of the first material and further disposed on the first layer 446a of the second material, a second layer 446b of the second material disposed on the third layer 444c of the first material, and a fourth layer 444d of the first material disposed on the second layer 446b of the second material. While four layers 444a-444d comprising the first material and two layers 446a-446b comprising the second material are shown, the first lead 420 may comprise any number of layers 444 comprising the first material and any number of layers 446 comprising the second material. Thus, the number of layers of both the first and second materials is not intended to be limiting.

In the magnetic recording head 485, the first material is Cr or Cu, and the second material is Au. The first layer 444a has a thickness in the y-direction of about 2 nm to about 5 nm, the second layer 444b has a thickness in the y-direction of about 2 nm to about 6 nm, the third layer 444c has a thickness in the y-direction of about 2 nm to about 6 nm, and the fourth layer 444d has a thickness in the y-direction of about 5 nm to about 10 nm. The first layer 446a has a thickness in the y-direction of about 70 nm to about 80 nm, and the second layer 446b has a thickness in the y-direction of about 15 nm to about 25 nm.

Figure 4E:
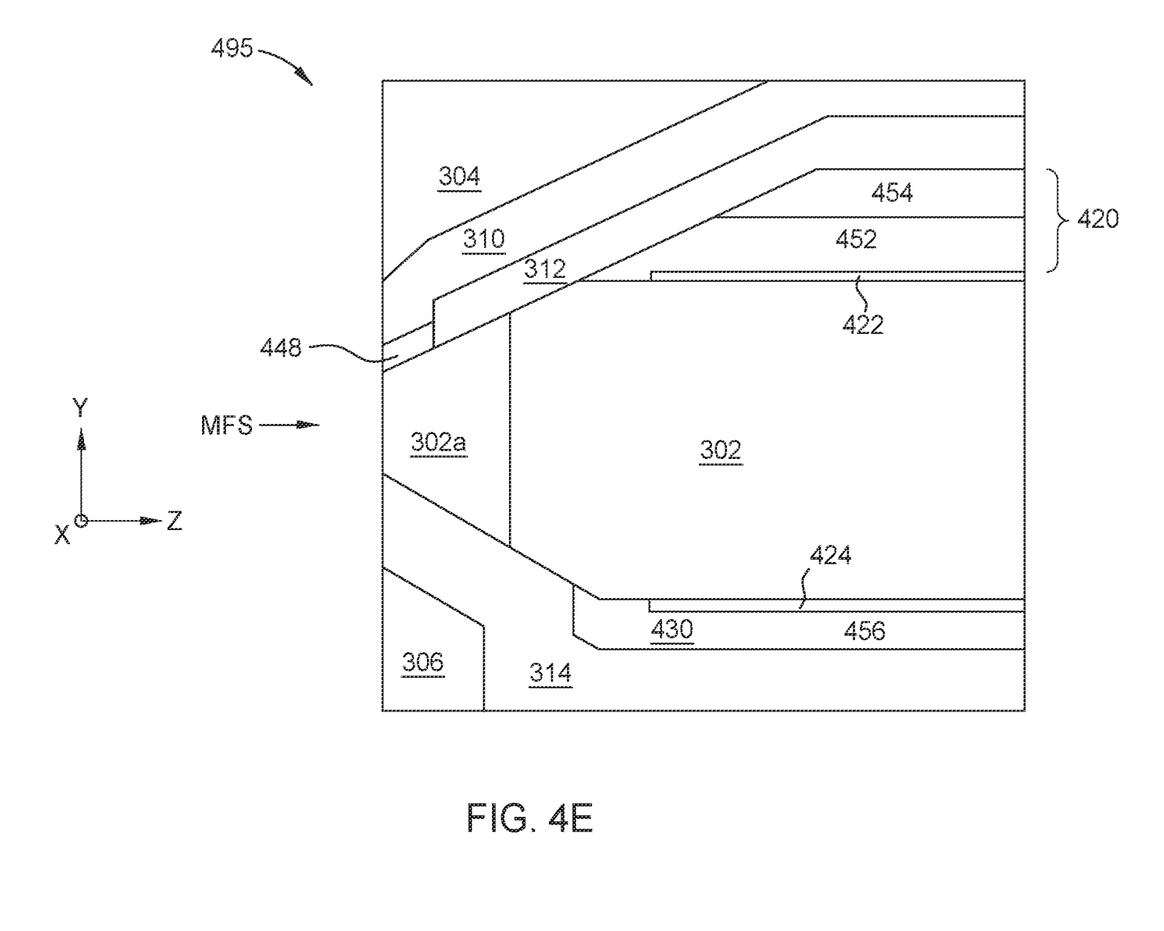

The magnetic recording head 495 of FIG. 4E is similar to the magnetic recording head 450 of FIG. 4B; however, the magnetic recording head 495 comprises an insulating layer 448 disposed between the first lead 420 and the MFS. The insulating layer 448 may comprise Al and have a height in the z-direction from the MFS to the first lead 420 of about 30 nm to about 70 nm.

FIG. 4E further illustrates one embodiment of the first lead 420 comprising one or more layers of various materials, and the second lead 430 comprising a layer of one material. However, as noted above, the number of layers of the first and second leads 420, 430 is not intended to be limiting. Thus, the second lead 430 may comprise multiple layers as well.

As shown in the magnetic recording head 495, the first lead 420 comprises a first layer 452 disposed in contact with the first insulating layer 422 and the main pole 302, and a second layer 454 disposed in contact with the first layer 452 and the trailing gap 312. The first layer 452 may comprise Cr or Cu and have a thickness in the y-direction of about 50 nm to about 80 nm. The second layer 454 may comprise Au and have a thickness in the y-direction of about 20 nm to about 50 nm. The second lead 430 comprises a single layer 456 of Cu, Cr, or Au, and has a thickness in the y-direction of about 30 nm to about 100 nm.

Utilizing either the first lead 420 and/or the second lead 430 to direct the current flow being the MFS prevents heat from generating at the tip 302a of the main pole 302, preventing the main pole 302 from breaking down and extending the overall life of the magnetic recording device. Additionally, the first and/or second leads 420, 430 improve flux jitter of the current by reducing the flux jitter, thus improving the signal-to-noise ratio of the magnetic recording head.

In one embodiment, a magnetic recording head comprises a trailing shield disposed at a media facing surface (MFS), a main pole disposed adjacent to the trailing shield at the MFS, a first lead disposed between the main pole and the trailing shield, the first lead being recessed from the MFS, wherein a first portion of the first lead is disposed in contact with the main pole, and a first insulating layer disposed between and in contact with a second portion of the first lead and the main pole, the first insulating layer being recessed from the MFS.

The first lead comprises one or more materials selected from the group consisting of Cu, Cr, Au, or combinations thereof. The first insulating layer comprises AlOx, where x is a numeral. The magnetic recording head further comprises a leading shield disposed adjacent to the main pole, and a Ru layer disposed between the main pole and the leading shield, the Ru layer extending to the MFS. The first portion of the first lead is disposed in contact with the main pole a length of about 150 nm to about 550 nm. The first portion of the first lead is disposed closer to the MFS than the second portion of the first lead. A magnetic recording device comprises the magnetic recording head. The first lead and the first insulating layer direct a current through the main pole at a location recessed from the MFS.

In another embodiment, a magnetic recording head comprises a trailing shield disposed at a media facing surface (MFS), a main pole disposed adjacent to the trailing shield at the MFS, a leading shield disposed adjacent to the main pole at the MFS, a trailing side lead disposed between the main pole and the trailing shield, the trailing side lead being recessed from the MFS, wherein a first portion of the trailing side lead is disposed in contact with the main pole, a trailing side insulating layer disposed between and in contact with a second portion of the trailing side lead and the main pole, the trailing side insulating layer being recessed from the MFS, a leading side lead disposed between the main pole and the leading shield, the leading side lead being recessed from the MFS, wherein a first portion of the leading side lead is disposed in contact with the main pole, and a leading side insulating layer disposed between and in contact with a second portion of the leading side lead and the main pole, the leading side insulating layer being recessed from the MFS.

The second portion of the trailing side lead is recessed further from the MFS than the first portion of the trailing side lead, and wherein the second portion of the leading side lead is recessed further from the MFS than the first portion of the leading side lead. The first lead and the second lead each individually comprise one or more materials selected from the group consisting of Cu, Cr, Au, or combinations thereof. The first lead comprises multiple layers of one or more materials, and wherein the first lead and the second lead comprise at least one same material. The first portion of the trailing side lead and the first portion of the leading side lead have a substantially same length, and wherein the first portion of the trailing side lead is disposed in contact with the main pole a length of about 150 nm to about 550 nm. A magnetic recording device comprises the magnetic recording head. The trailing side lead, the trailing side insulating layer, the leading side lead, and the leading side insulating layer direct a current through the main pole at a location recessed from the MFS.

In yet another embodiment, a magnetic recording device comprises a magnetic recording head, the magnetic recording head comprising: a trailing shield disposed at a media facing surface (MFS), a main pole disposed adjacent to the trailing shield at the MFS, a spintronic device disposed between the trailing shield and the main pole at the MFS, a first lead disposed between the main pole and the trailing shield, the first lead being recessed from the MFS, wherein a first portion of the first lead is disposed in contact with the main pole, and means for directing a current from the first lead into the main pole at a first location recessed from the spintronic device. The magnetic recording head further comprises a leading shield disposed adjacent to the main pole, a second lead disposed between the main pole and the leading shield, the second lead being recessed from the MFS, wherein a first portion of the second lead is disposed in contact with the main pole, and means for directing the current from the second lead into the main pole at a second location recessed from the spintronic device. The first lead and the second lead each individually comprise one or more materials selected from the group consisting of Cu, Cr, Au, or combinations thereof. The first lead is recessed from the MFS a distance of about 80 nm to about 150 nm, and the second lead is recessed from the MFS a distance of about 80 nm to about 150 nm. The first portion of the first lead is disposed in contact with the main pole a length of about 150 nm to about 550 nm. The first lead comprises multiple layers of one or more materials.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a trailing shield disposed at a media facing surface (MFS);
   a main pole disposed adjacent to the trailing shield at the MFS;

a first lead disposed between the main pole and the trailing shield, the first lead being recessed from the MFS, wherein a first portion of the first lead is disposed in contact with the main pole, and wherein a second portion of the first lead has a greater thickness than the first portion; and
a first insulating layer disposed between and in contact with the second portion of the first lead and the main pole, the first insulating layer being recessed from the MFS.

2. The magnetic recording head of claim 1, wherein the first lead comprises one or more materials selected from the group consisting of Cu, Cr, Au, or combinations thereof, wherein the first insulating layer comprises AlOx, where x is a numeral.

3. The magnetic recording head of claim 1, further comprising:
a leading shield disposed adjacent to the main pole; and
a Ru layer disposed between the main pole and the leading shield, the Ru layer extending to the MFS.

4. The magnetic recording head of claim 1, wherein the first portion of the first lead is disposed in contact with the main pole a length of about 150 nm to about 550 nm.

5. The magnetic recording head of claim 1, wherein the first portion of the first lead is disposed closer to the MFS than the second portion of the first lead.

6. A magnetic recording device comprising the magnetic recording head of claim 1.

7. The magnetic recording device of claim 6, wherein the first lead and the first insulating layer direct a current through the main pole at a location recessed from the MFS.

8. A magnetic recording head, comprising:
a trailing shield disposed at a media facing surface (MFS);
a main pole disposed adjacent to the trailing shield at the MFS;
a leading shield disposed adjacent to the main pole at the MFS;
a trailing side lead disposed between the main pole and the trailing shield, the trailing side lead being recessed from the MFS, wherein a first portion of the trailing side lead is disposed in contact with the main pole;
a trailing side insulating layer disposed between and in contact with a second portion of the trailing side lead and the main pole, the trailing side insulating layer being recessed from the MFS;
a leading side lead disposed between the main pole and the leading shield, the leading side lead being recessed from the MFS, wherein a first portion of the leading side lead is disposed in contact with the main pole; and
a leading side insulating layer disposed between and in contact with a second portion of the leading side lead and the main pole, the leading side insulating layer being recessed from the MFS.

9. The magnetic recording head of claim 8, wherein the second portion of the trailing side lead is recessed further from the MFS than the first portion of the trailing side lead, and wherein the second portion of the leading side lead is recessed further from the MFS than the first portion of the leading side lead.

10. The magnetic recording head of claim 8, wherein the trailing side lead and the leading side lead each individually comprise one or more materials selected from the group consisting of Cu, Cr, Au, or combinations thereof.

11. The magnetic recording head of claim 8, wherein the trailing side lead comprises multiple layers of one or more materials, and wherein the trailing side lead and the leading side lead comprise at least one same material.

12. The magnetic recording head of claim 8, wherein the first portion of the trailing side lead and the first portion of the leading side lead have a substantially same length, and wherein the first portion of the trailing side lead is disposed in contact with the main pole a length of about 150 nm to about 550 nm.

13. A magnetic recording device comprising the magnetic recording head of claim 8.

14. The magnetic recording device of claim 13, wherein the trailing side lead, the trailing side insulating layer, the leading side lead, and the leading side insulating layer direct a current through the main pole at a location recessed from the MFS.

15. A magnetic recording head, comprising:
a trailing shield disposed at a media facing surface (MFS);
a main pole disposed adjacent to the trailing shield at the MFS;
a first lead disposed between the main pole and the trailing shield, the first lead being recessed from the MFS, wherein a first portion of the first lead is disposed in contact with the main pole, wherein a second portion of the first lead has a greater thickness than the first portion, and wherein the first lead comprises one or more layers of materials selected from the group consisting of Cu, Cr, Au, and a combination thereof; and
a first insulating layer disposed between and in contact with the second portion of the first lead and the main pole, the first insulating layer being recessed from the MFS.

16. The magnetic recording head of claim 15, further comprising a second lead disposed between the main pole and a leading shield, the second lead being recessed from the MFS, wherein a first portion of the second lead is disposed in contact with the main pole.

17. The magnetic recording head of claim 15, wherein the first portion of the first lead is disposed in contact with the main pole a length of about 150 nm to about 550 nm.

18. The magnetic recording head of claim 15, wherein the first portion of the first lead is disposed closer to the MFS than the second portion of the first lead.

19. A magnetic recording device comprising the magnetic recording head of claim 15.

20. The magnetic recording device of claim 19, wherein the first lead and the first insulating layer direct a current through the main pole at a location recessed from the MFS.

* * * * *